March 24, 1959 D. K. McLEAN 2,879,367
FOOD PACKAGE

Filed April 25, 1955 10 Sheets-Sheet 1

Douglas K. McLean
INVENTOR.

Douglas K. McLean
INVENTOR.

March 24, 1959     D. K. McLEAN     2,879,367
FOOD PACKAGE Filed April 25, 1955     10 Sheets-Sheet 4

Douglas K. McLean
INVENTOR.

March 24, 1959  D. K. McLEAN  2,879,367
FOOD PACKAGE

Filed April 25, 1955  10 Sheets-Sheet 7

Douglas K. McLean
INVENTOR.

United States Patent Office 2,879,367
Patented Mar. 24, 1959

2,879,367

FOOD PACKAGE

Douglas K. McLean, Dallas, Tex.

Application April 25, 1955, Serial No. 505,017

10 Claims. (Cl. 219—19)

This invention relates to a food package capable of heating itself by electrical resistance and to the apparatus in which the package is heated.

It is an object of this invention to provide a wrapping of a package with a built in electrical heating resistance which may merely be clamped to a source of current to heat the contents of the package. Another object of the invention is to provide a bendable electrical resistance material, such as a resistance paint as a printed electric circuit sandwiched between two layers of a material of a non-conducting material in a food package.

A still further object of the invention is to provide a device either mounted on a wall or placed on a table or other support having a pair of clamps which are adapted to bite through the insulating film of the package to make contact with the electric resistance material to thereby impart heat to the contents of the package, to thus eliminate the need for a stove or other cooking apparatus. Also the present invention eliminates the need for pots and pans or other food holder while cooking or baking the contents of the package.

Another object of the invention resides in the provision of a device for cooking food in which clamping electrode prongs are arranged pivoted to permit ready application and removal of the package together with means on the package to indicate when the contents of the package are heated.

A still further object of the invention resides in a package which is particularly adapted to be used in vending machines and the food package may be frozen if desired. Another object of the invention resides in a food package of which the wrapper is made of such a material that it can be used as a food plate and the like from which the food may be consumed.

Further objects will be apparent from the following description when considered in connection with the accompanying drawings in which.

Figure 1:
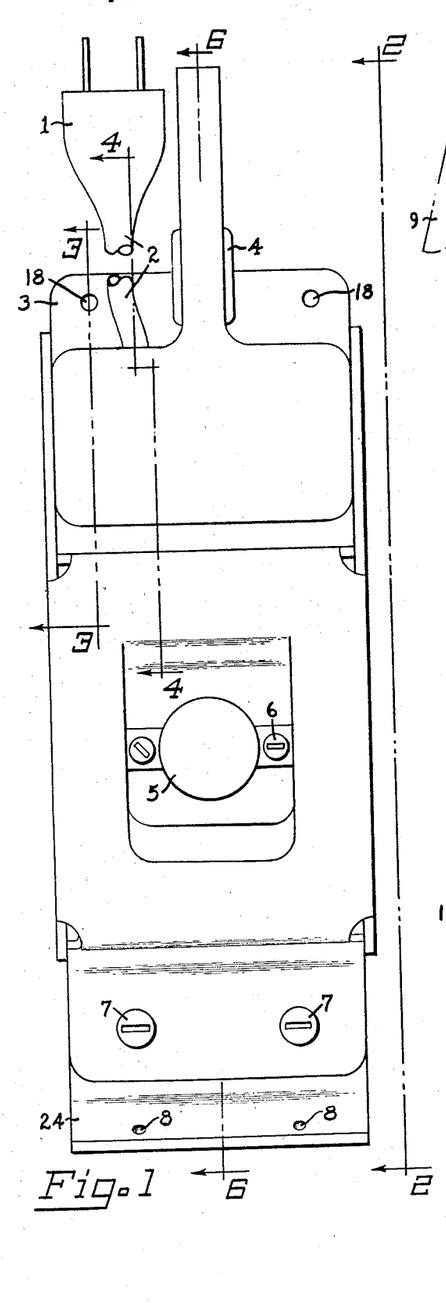
Figure 1 is a front elevation of the connection clamp switch.
Figure 2:
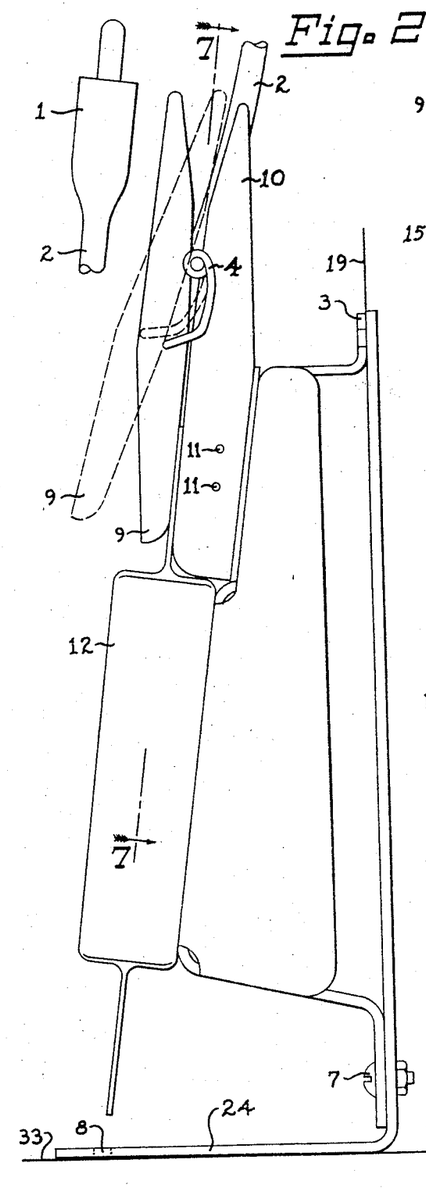
Fig. 2 is a side elevation of the clamp switch with a package connected thereto as viewed along line 2—2 of Fig. 1 in the direction of the arrows.

Referring now to Figs. 1 and 2 the device for heating the food package 12 includes a two prong electric plug 1 which may be connected to any 110–115 volt A.C. electric outlet. A similar plug may be used to fit the cigarette lighter outlet, not shown, of an automobile or to any other outlet. A rubber two strand covered electric cord 2 carries the current to the clamping element to which the food package is connected. The current feed device to the package comprises a sheet metal stamped frame or bracket 3 shaped so that it provides a means of supporting the clamping device 9 and 10 spaced far enough from the wall or vertical mounting surface 19 as to prevent the transfer of a dangerous quantity of heat. This stamping 3 is made of a metal or other substance having a good reflective surface and poor heat conductivity, such as chrome-plated mild steel. This stamping 3 is so shaped as to provide side flaps for the protection of the operator from the wiring to a thermostat 5, and so shaped as to provide a mounting surface for the thermostat 5, and to provide a mounting surface for the clamp part 10. The stamping 3 is also provided with feet and screw holes for attaching the device to the vertical surface 19, and for attaching a protective cover plate 20 having a mounting-base bracket 24. The frame 3 is also so shaped as to hold the package 12 at an angle, Figs. 1 and 6, such that gravity will cause the package 12 to come in contact with a thermostat 5 while the package is heating its contents 25. An ordinary standard clothes-pin spring 4 is used for the clamp jaws 9 and 10. The size of the spring will be determined by the size and weight of the package and its contents 25.

Figure 6:
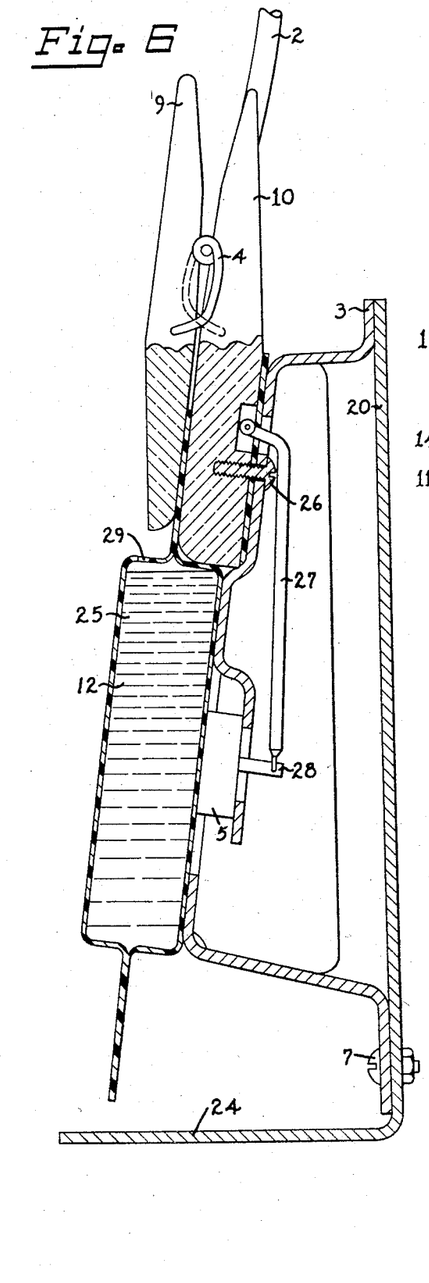
Fig. 6 is a sectional view of the complete assembly showing a package clamped in the switch and in contact with a thermostat taken on line 6—6 of Fig. 1 in the direction of the arrows.
Figure 7:
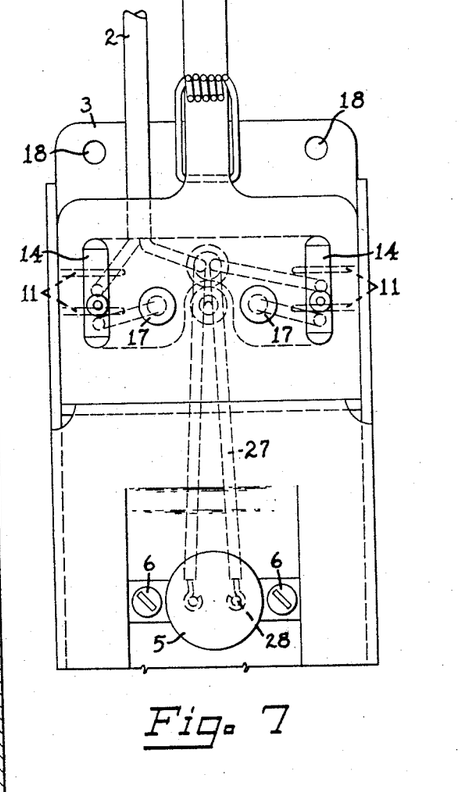
Fig. 7 is a diagrammatic view of a wiring circuit.
Figures 8, 9, 11:
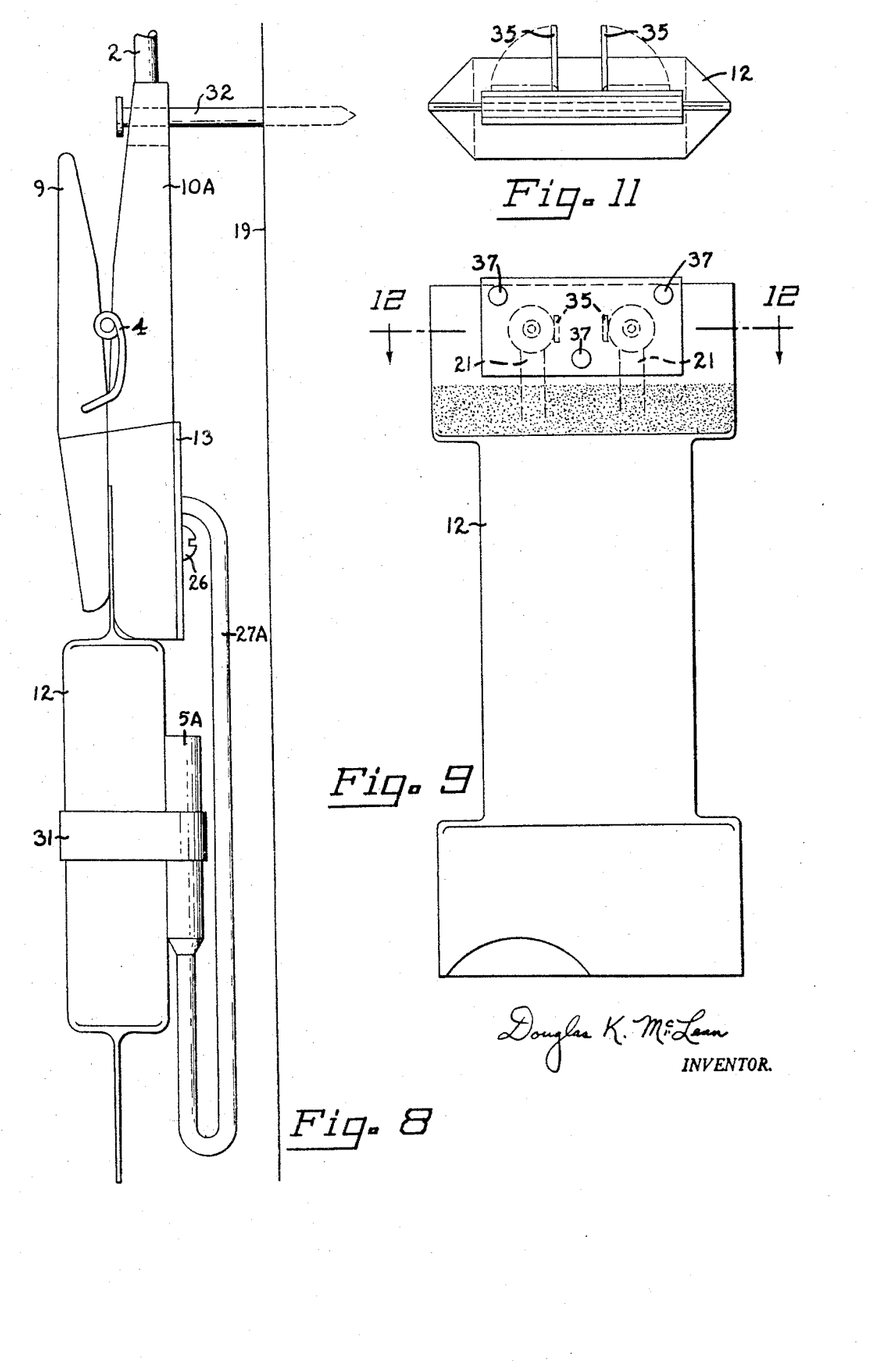
Fig. 8 is a side elevation of a connecting clamp switch with a package associated therewith and showing a modified construction.
Fig. 9 is a front elevation of a package combined with a plug connector device permanently connected to the package.
Fig. 11 is a top view of the plug connector device and package of Figs. 9 and 10.
Figure 10:
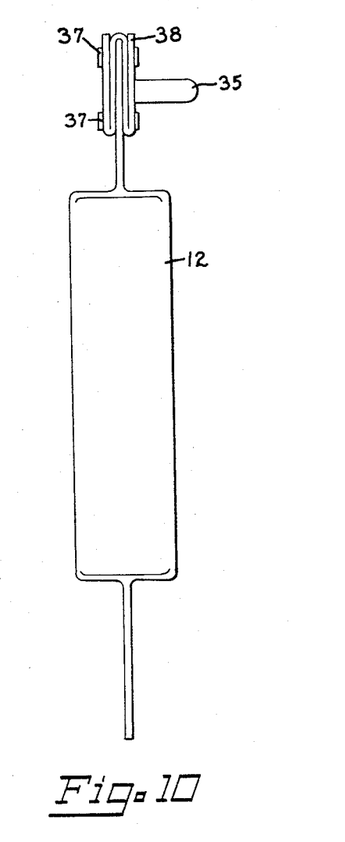
Fig. 10 is a side view of the package of Fig. 9.

The thermostat or heat operated switch 5 is set to maintain a closed electric circuit at temperatures up to a predetermined temperature slightly below the safe operating limit of the materials of the package. A wire 27, Fig. 6, is connected to the switch 5 by means of a terminal 28. The thermostat or thermal operated switch 5A of Fig. 8 is set to maintain a closed circuit essentially the same as described in connection with thermostat 5 except that it is attached to a flexible cord 27A and is sealed from moisture by a flexible, heat and water resistant material such as silicone, rubber or the like. The thermostat 5A may be secured to the package 12 by a band or strap 31.

Screws 6 or other fastening devices may be used for fastening the thermostat 5 to the bracket 3. Any screw, rivet, or other fastening device or method suitably may be used for fastening bracket 3 to bracket 24 and the latter may be provided with holes 8 for mounting the bracket to a horizontal surface such as 33. The bracket 24 as a mounting base is preferably made of mild steel.

To heat the package 12 two jaw clamps 9 and 10 are provided which are made of a strong, hard and rigid non-conductor of electricity, capable of withstanding the maximum heat that will be emitted by a heater element 21. A suitable material would be glass (Pyrex or Vycor), porcelain, or any plastic material possessing the required properties. In the interests of safety, this material should be treated with a waterproofing film such as silicone, or equivalent. The top jaw 9 is so shaped as to exert a clamping action against a flap 39 sufficient to hold package 12 against gravitational pull. The jaw clamp 9 is also so shaped as to depress flap 39 so as to make the heater element 21 come into good electrical contact with electrodes 17. The jaw is also so shaped as to close the circuit in switches 14 only when the jaw is closed and is also shaped to provide for the mounting spring 4. The clamp 9 also protects electrodes 17 and switches 14 from the operator. The bottom jaw 10 is secured to the bracket 3 by screws 26, Fig. 6, and this jaw is so shaped as to provide a backup surface for the jaw 9 and to provide a rigid mounting frame or base for the switches 14 and electrodes 17. The clamp receives the wiring and it is also provided with a threaded screw hole for rigidly attaching the clamp jaw 10 to the insulator plate 13 and bracket 3 by means of screw 26.

The clamp 10A, Fig. 8, is similar to clamp 10 except that it has an extension and a hole for hanging the clamping assembly from a nail, screw or peg 32 or other support. A plurality of pins 11 secure switch 14 to the jaw 10 and each pin is made of a strong hard material and should be of such diameter that it is a slip fit in the holes in the switch 14 and a light press fit in the holes in jaw 10.

Figure 5:
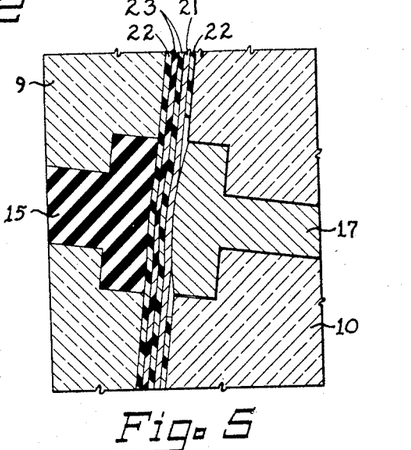
Fig. 5 is a sectional view of a detail of the electrode making contact with the heater element of the package.
Figure 5A:
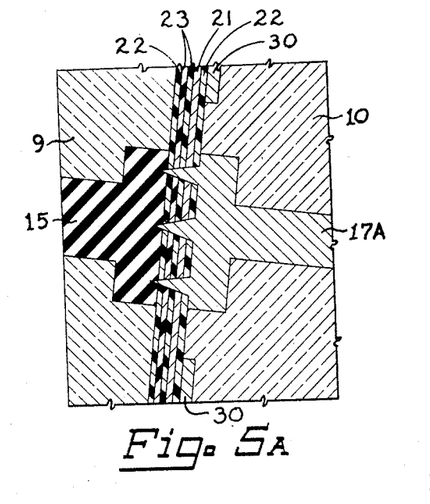
Fig. 5A is a sectional view of the detail of Fig. 5 showing a modified electrode.
Figure 12:
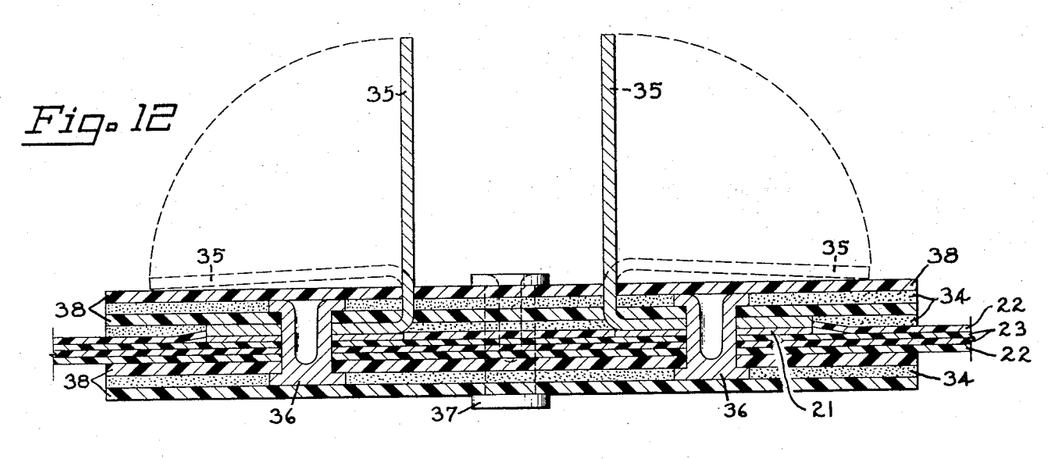
Fig. 12 is a cross sectional view of the plug device and package of Figs. 9 to 11 taken on line 12—12 of Fig. 9 in the direction of the arrows.
Figure 13:
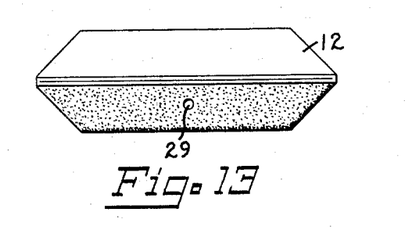
Fig. 13 is a top view of a package for use with a non-expendable clamping device.
Figure 14:
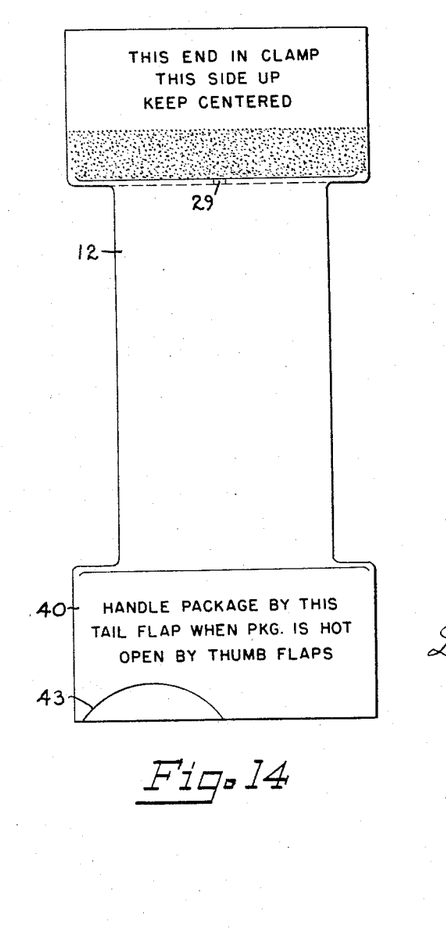
Fig. 14 is a front elevation of the package of Fig. 13.
Figure 15:
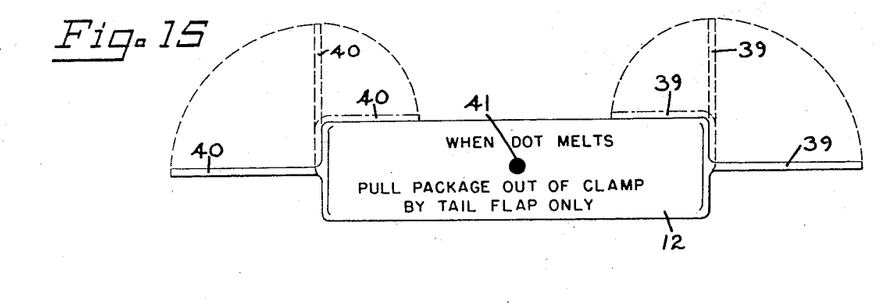
Fig. 15 is a side view of the package of Figs. 13 and 14.

The package 12 is constructed in such a manner that it is capable of imparting heat to its contents 25, Fig. 6, by means of heat emitted by heating element 21 which is electrically insulated by dielectric base layer or plastic film 23 and dielectric cover layer or plastic film 22, Figs. 5 and 5A, both of which are held together to form a lamination by an adhesive substance 34, Fig. 12. Any sheet material may be used and any plastic film may likewise be utilized for the layers 22 and 23. The construction, and function of this package will be more completely described.

Figure 3:
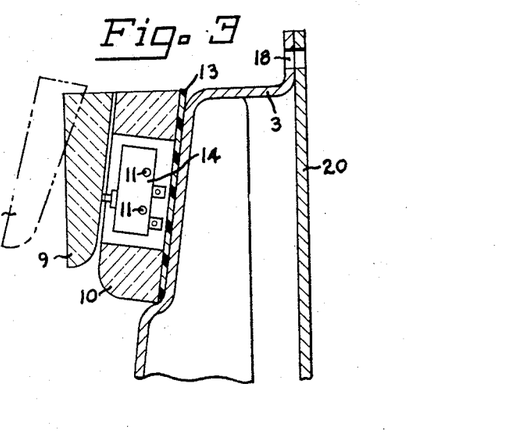
Fig. 3 is a sectional view of a detail of the switch taken on the line 3—3 of Fig. 1 in the direction of the arrows.
Figure 4:
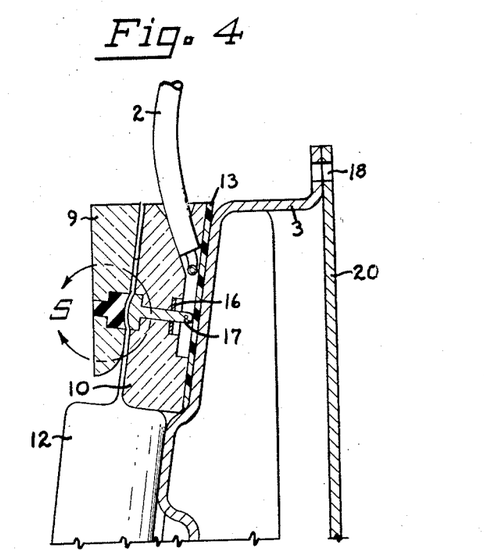
Fig. 4 is a sectional view of a detail of an electrode and related components taken on the line 4—4 of Fig. 1 in the direction of the arrows.

As shown in Figs. 3 and 4 dielectric plate 13 is provided between the clamp 10 and the frame 3 and is made of a non-conductor of electricity and is strong, preferably rigid, and capable of withstanding the maximum heat emitted by the heating element 21. The plate 13 has a hole therein provided for the passage of wires 27, Fig. 6, and that plate also has a hole therein for screw 26 to secure the clamp 10 to the frame 3. The plate 13 may be secured to the jaw 10 by an adhesive substance 34, Fig. 12. The hole in plate 13 for the passage of the wires 27 is smaller than the corresponding hole in the bracket or frame 3 to provide additional safety against a possible electrical short circuit in the event that the insulation of wires 27 or 27A should be abraded away.

The switch 14 is preferably a single pole, single throw and normally open structure closed by pressure exerted by flap 39 of the package when it is depressed by the jaw 9. The switch is of conventional type.

As shown in Figs. 5 and 5A the jaw 9 is provided with a resilient grommet 15 made of any resilient material that is a non-conductor of electricity and is capable of withstanding the maximum heat generated by the heating element 21.

The electrode 17, Fig. 4, is retained by a spring type ring 16 in the jaw 10. The electrode 17 is made of a strong, hard and rigid material that is a good conductor of electricity and has good resistance to corrosion and abrasion, and is capable of being soldered. The contact face is coated with a precious or semi-precious metal resistant to electrical arcing and pitting. Suitable base metals are Phosphor bronze and beryllium copper and suitable platings are preferably in the platinum metal family. Each electrode 17 is so shaped as to have a dome-shaped surface for contacting the heating element 21.

The electrodes 17A of Fig. 5A are essentially the same as electrodes 17 except that each electrode 17A has multiple sharp points so shaped as to make them capable of piercing the dielectric protective layer 22 of the package 12 in order to make good electric contact with the heater element 21. These piercing prongs are plated with a metal resistant to electrical arcing and pitting.

Suitable holes 18 are provided in the bracket 3 for use in mounting the bracket 3 securely to a vertical surface 19, Fig. 2, which can be a fixed vertical mounting surface such as the wall of a building or a post. A protective cover plate 20, Fig. 6, is used when the bracket 3 is not mounted against a fixed vertical surface. This plate 20 is to protect the wiring 27 from the operator. When the bracket 24 is attached to the bracket 3, plate 20 is an extension of bracket 24.

As to the heating element 21 which is provided in the package 12 such element is a resilient or bendable paint or ink deposited on the dielectric base 23 by printing, dipping, spraying, brushing, or by any other method, said paint or ink being of such composition as to be capable of serving as an electric resistance heating element. A resilient or bendable layer of metal with a suitable electrical resistance is secured to the base dielectric layer 23 by chemical electrolysis, spray metalliing, vacuum metallizing, or any other suitable method. The heating element can be in the form of a metal foil having high electrical resistance and capable of being bent several times before breaking. A heater element of expanded metal foil is economical of foil but may require the use of a voltage stepdown transformer. The expanded metal foil is secured at the mid-point to base 23 by an adhesive 34 so as to allow the ends of the zig-zags of foil, Fig. 21, to be free to expand and contract with slippage to allow for the differential in coefficients of thermal expansion of the foil and the dielectric layers. The adhesive 34 is such as to resist heat within the range of temperature that the contents of the package is to be subjected and is capable of resisting moisture over a long period of time. The material 34 is also a dielectric material or electrical insulator.

It is also possible to use an electric resistance heater wire of very small diameter. Even the smallest diameter made requires the use of a voltage step-down transformer to use it as shown.

Figure 21:
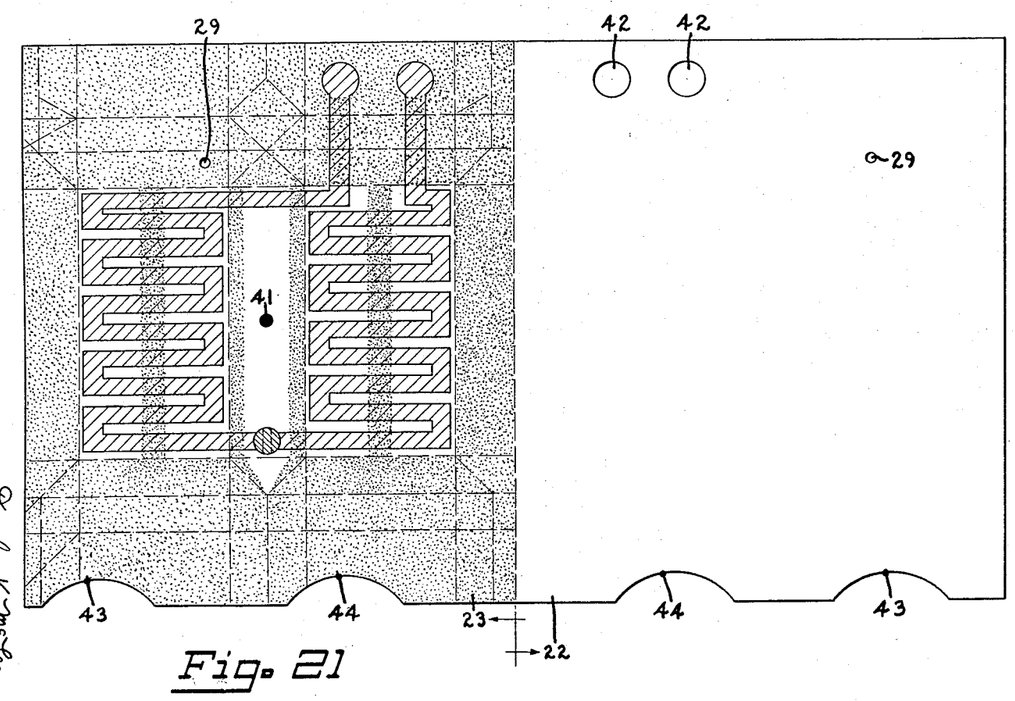
Fig. 21 is a diagrammatic view of the other side of the wrapper blank of Fig. 20, and Figs. 22 to 25 are cross sectional views of details of the materials of the package made from the blanks of Figs. 20 and 21.
Figure 22:
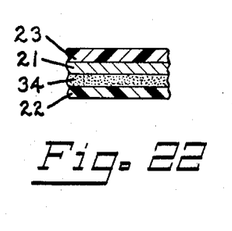

The package includes a dielectric cover flap protective layer 22 made of any suitable material that is a non-conductor of electricity, readily bendable, resistant to moisture and resistant to heat or capable of withstanding heat without curling, softening, or stretching. As shown in Fig. 21 a dielectric base layer 23 is provided for mounting the heating element 21 and any material that is a non-conductor of electricity, resistant to moisture and electricity, and is readily bendable, is satisfactory.

The package 12 is preferably provided with a vent hole 29, Figs. 13, 14, 20 and 21 to permit vapor and steam to escape. The vent hole 29 is sealed shut by the adhesive 34 on the flap 39 until the package is removed from an outside wrapper and flap 39 is unwrapped to permit the inserting of flap 39 into the clamping jaws 9 and 10.

As shown in Fig. 5A a stripper spring of any suitable material may be provided to push the heating element 21 and the laminations 22, 23 and 34 of flap 39 off of the piercing prongs of electrode 17A. The spring 30 is securely fastened at the bottom and only to the bottom of the jaw 10, and the free end is shown in the depressed position in Fig. 5A. The point of attachment of spring 30 to the jaw 10 is not shown because the nature and use of stripper springs is well known.

Electric plug prongs 35 are provided which are rigid to permit its insertion into an electrical outlet socket, and is bendable about a sharp radius several times without cracking or breaking as shown by dash lines in Fig. 11. A suitable material for the prongs is aluminum or copper, and they are so shaped as to permit the prong to be folded back against dielectric material 38 until the package is to be used, whereupon they are bent into position by the user or consumer. The prongs 35 are so shaped as to provide for a good electrical contact with the heating element 21 in the package and has a hole in it for a rivet or fastener, capable of keeping prong material in good electrical contact with heating element. A plurality of rivets or other fasteners 37 are provided to secure the outer flaps of the dielectric material 38 in the position shown. This fastener is made of a material having good mechanical strength over a wide temperature range and is a non-conductor of electricity. The dielectric prong holder 38 for the prongs 35 acts as a protective cover and is made of one sheet of a semi-rigid material that is capable of resisting moisture and heat, and capable of being stamped and bent to the shape shown. This material must be thick enough and stiff enough to add some rigidity to the prong assembly thus facilitating the insertiton and removal of the prongs from an electrical outlet socket with minimum hazard to the operator.

Figure 16:
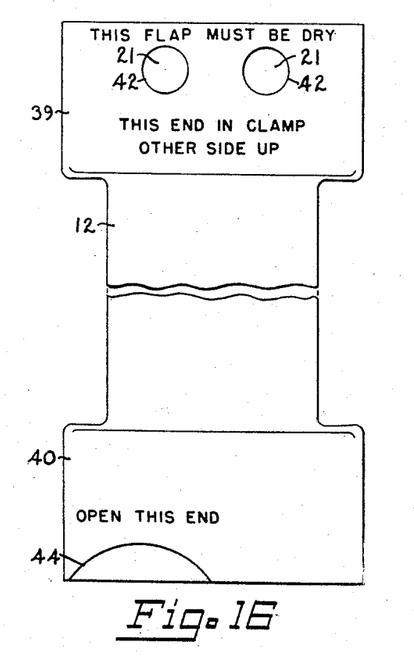
Fig. 16 is a rear view of the package of Figs. 13 to 15.
Figure 17:
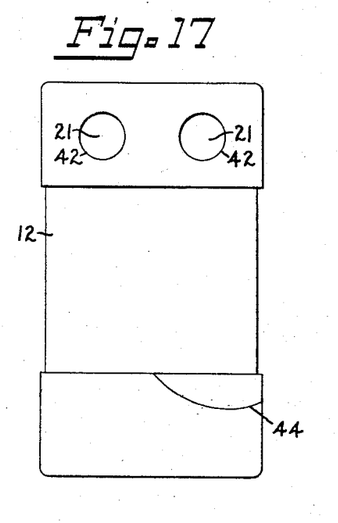
Fig. 17 is a front elevation of the package of Fig. 14 with the flaps folded against the package.
Figure 18:
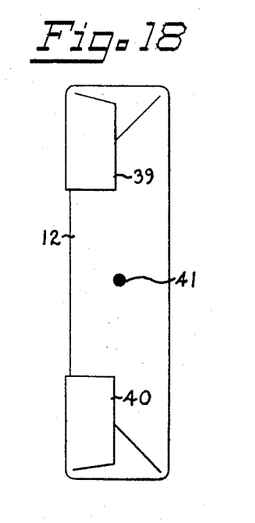
Fig. 18 is a side view of the package of Fig. 17.
Figure 19:
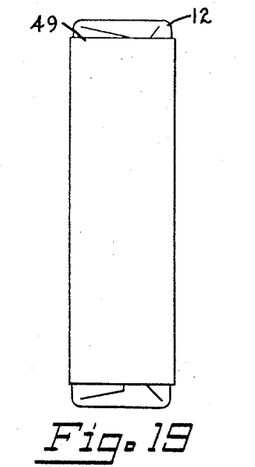
Fig. 19 is a side view of the package of Fig. 18 with an outer wrapper.
Figure 20:
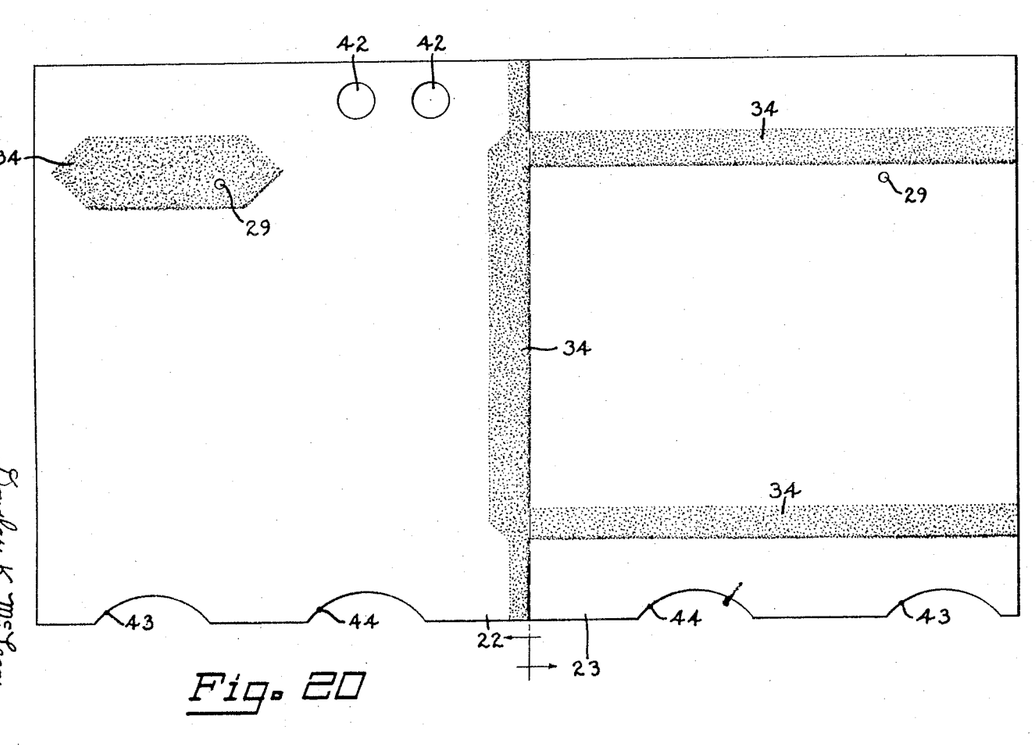
Fig. 20 is a diagrammatic view of one side of the wrapper blank.

The top flap portion 39, Fig. 16, of package 12 is made up of heating element 21 and layers 22, 23 and 34, and it is so shaped as to be flat and thin enough to permit its easy insertion into the clamping assembly 9 and 10. The flap portion 39 has a layer of adhesive 34 so arranged that it seals the vent hole 29 when flap 39 is folded as shown in Figs. 17 to 19. Flap 39 is perforated with holes 42 in the layer 22 so as to permit electrodes 17 to make electrical contact with the heating element 21. However, as an optional choice, where for the sake of economy the material of heating element 21 is made of a cheap material not capable of resisting corrosion, no holes 42 will be provided, and electrical contact will be made with the heating element 21 by means of the piercing electrode 17A, Fig. 5A. Flap 39 is provided with a strip of adhesive 34 as shown in Fig. 20 for the purpose of keeping the contents 25 of package 12 mechanically contained and sealed against outside air and moisture. Tail flap portion of package 12 functions as a relatively cool handling surface for removing the heated package 12 from the clamping device 9 and 10, and for opening the package while it is hot by means of thumb and finger grips 43 and 44, Figs. 20 and 21, to make contents 25 accessible to the user without the user having to wait for the package to cool or without the user having to use a knife, scissors, or other special device other than his own hands to open the package 12. The tail portion 40 is provided with a strip of adhesive 34 as shown in Fig. 20, to mechanically retain contents 25 and seal the contents against outside air and moisture and/or to retain inside moisture.

If desired to indicate when the contents 25 of package 12 has been heated to the desired temperature, a dot 41 may be applied, Fig. 18, which melts and runs when contents 25 reach the predetermined melting temperature of the material of which the dot is composed. The holes 42 in dielectric cover layer 22 permit electrode 17 to make electrical contact with the heating element 21. In instances where for the sake of economy a heater element having poor resistance to corrosion is used, the holes will be omitted to permit protective cover 22 to protect the heater 21, in which case electrical contact will be made by the piercing electrode 17A. An alternate choice to omitting holes 42 when using a corrosionable heater element 21 is to plate the heater 21 with a non-corrosive electrical conductor material at the area that is exposed only by the holes 42. The cut-out portions 43 for thumb or finger grip to open flap 40 to expose the contents of the package are so cut, folded, arranged, and sealed as to permit opening the wrapper out into a flat surface while the contents are hot. This is particularly useful in the case of packages of food because it enables the user to eat the contents directly from or off the wrapper, thus precluding the necessity of using plates or dishes in addition to precluding the use of a stove or pots or pans for heating. The cut-out portions 43 permit an opposing pull on the two sides of the flap 40.

Figure 23:
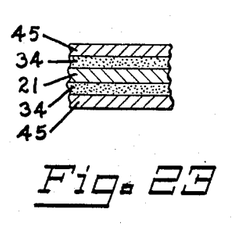
Figure 24:
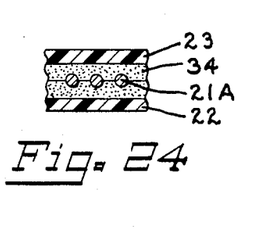
Figure 25:
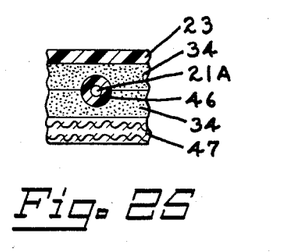

Foil or other material 45, Fig. 23, may be used having good mechanical strength and bendability, capable of withstanding high temperatures (temperatures in excess of the temperature to which contents 25 are to be heated) and preferably capable of resisting moisture.

An electrical insulating coating 46 for the heater 21 must be capable of resisting heat and must be a good electrical insulator, and must be readily bendable, and should resist moisture though this property is unnecessary when it is used with the material 34 that is capable of resisting moisture. Also clutch 46 such as Fiberglas or asbestos capable of withstanding high temperature and possessing good mechanical strength may be used.

A fuse may be used, if desired, located bridging a gap in the heater element 21 directly below the dot 41 of Fig. 21. This fuse is made of a material that is a good conductor of electricity and has a melting point just below the maximum temperature operation limit of the materials of which package 12 is made, said melting point being above the setting of the thermostat. This material must be capable of adhering to the heater element 21.

The package and other components of this invention as shown and described herein are particularly adapted to vending food in one-serving quantities from a standard vending machine. It is assumed that the vending machine can be refrigerated as required for preserving the contents of the package until the package is vended. This package is printed, cut, shaped, punched, folded, and has adhesive provided, and vent holes made therein, and has flaps for relatively cool handling and opening of the package even while the contents are hot. The package is folded and sealed in such a way to permit the user to open the package out into a flat surface from which the food can be consumed, thus eliminating the use of a plate as well as eliminating the need for a stove, or pots or pans, and in turn eliminating the need for washing pots, pans and dishes.

The construction of the package makes it highly suitable for cooking foods within the package, or heating foods within the package regardless of whether the heat is applied by a built-in heating element or whether the heat is added externally by immersing the package in hot water or by hanging the package in an oven.

The construction of the package 12 as shown and described in Fig. 23 makes it possible to carry out the actual cooking of foods in the package.

The construction of the package 12 as illustrated in Figs. 11, 9, 10 and 12 makes it possible to use the self-heating package without the use of a clamping device, though it is of course obvious that the clamping device would be safer to use, and the clamping device makes it possible to use a cheaper construction of the package.

It is believed that the operation of the food package and the package support and current supply device are obvious from the foregoing description and the drawings.

The package as for instance shown in Figs. 9, 10, 14, 18 and 19 is self-contained as to its food contents and the electrical means to heat the food contents not only to just heat the food but also to cook it. The package is merely clamped in one of the devices of Figs. 1, 2, 6 and 8 which not only supports the package but also carries the electric current to the resistance circuit in the wrapper of the package. Each device includes a switch clamp to cooperate with the flap of the package to convey the electric current to the resistance circuit. By the mere operation of the clamp member 9 the circuit is closed to the resistance unit.

I claim as my invention:

1. An expendable package for materials comprising a wrapper having incorporated therein and electric resistance to surround and enclose the material and which is adapted to be connected to an electric circuit to heat the material in the package without removing the wrapper, a flap on one end of the package integral with the wrapper, and an electrical connector secured to the flap in electrical contact with the resistance in the wrapper and adapted to be connected to an electric outlet, said connector being in the form of a pair of spaced contact strips which are bendable so that they may be flat against the flap during non-heating condition of the package.

2. A wrapped package for transporting substances and to be heated therein, comprising a wrapping having a flap at opposite ends, said wrapping being formed around and enclosing the substance, an electrical resistance heating element secured to the wrapping, and electrical connecting members in one of the flaps and connected to the heating element to heat the substance in the wrapped package, the other flap permitting handling of the package when heated by the heating element.

3. A wrapped package for transporting substances and to be heated therein, comprising a wrapping having a flap at opposite ends, said wrapping being formed around and enclosing the substance, an electrical resistance heating element secured to the wrapping, and electrical connecting members in the form of foldable prongs in one of the flaps and connected to the heating element to heat the substance in the wrapped package, the other flap permitting handling of the package when heated by the heating element.

4. A wrapped package for transporting substances and to be heated therein, comprising a sheet wrapping material formed around and enclosing the substance and having at least one flap, an electric heating element carried by the wrapping material, and means in the flap to receive electric current and to convey it to the heating element to heat the substance in the wrapped package.

5. A wrapped package for material to be heated therein, comprising a dielectric wrapping base for the material formed around and enclosing the material, a heating element on the wrapping base, and a flap portion at opposite ends of the package and consisting of the wrapping base, one flap portion being adapted to connect the heating element to an electrical source to heat the material in the wrapped package and the other flap permitting handling of the package when heated.

6. A wrapped package for material to be heated therein, comprising a dielectric wrapping base for the material formed around and enclosing the material, a heating element on the wrapping base, and a flap portion at opposite ends of the package and consisting of the wrapping base, one flap portion being adapted to connect the heating element to an electrical source to heat the material in the wrapped package and the other flap permitting handling of the package when heated, said heating element being printed on the wrapping base.

7. A wrapped package for material to be heated therein, comprising a dielectric wrapping base for the material formed around and enclosing the material, a heating element on the wrapping base, and a flap portion at opposite ends of the package and consisting of the wrapping base, one flap portion being adapted to connect the heating element to an electrical source to heat the material in the wrapped package and the other flap permitting handling of the package when heated, said wrapping base having means thereon to indicate the temperature of the heated material.

8. A wrapped package for material to be heated therein, comprising a dielectric wrapping base for the material formed around and enclosing the material, a heating element on the wrapping base, and a flap portion at opposite ends of the package and consisting of the wrapping base, one flap portion being adapted to connect the heating element to an electrical source to heat the material in the wrapped package and the other flap permitting handling of the package when heated, said wrapping base having at least one hole therein to permit addition of water without removal of the wrapping base and to permit escape of steam when the material is heated.

9. A wrapped package for transporting substances and to be heated therein, comprising a wrapping having a flap at opposite ends and formed around and enclosing the substance, an electrical resistance heating element secured to the wrapping, and electrical connecting members in the form of foldable prongs in one of the flaps and connected to the heating element to heat the substance in the wrapped package, the other flap permitting handling of the package when heated by the heating element, and said wrapping having vent holes therein each with a seal which latter are automatically broken when the flap with the prongs is unfolded to be attached to an electric source whereby the package remains sealed until the package is to be used.

10. A wrapped and expendable package for substances comprising a combination wrapping and an electric heating element formed around and enclosing the substance and being deformable, and means forming a part of the wrapping at one end of the package and connected to the heating element to heat the substance in the wrapped package when the latter is connected to a source of electric current, said means including two spaced electrodes for connection to the source of electric current, and being in the form of foldable prongs insertable in an electric outlet of the source of electric current.

References Cited in the file of this patent

UNITED STATES PATENTS

| | | |
|---|---|---|
| 1,469,626 | Dorsey | Oct. 2, 1923 |
| 1,716,266 | Flamm | June 4, 1929 |
| 1,992,593 | Whitnet | Feb. 26, 1935 |
| 2,125,402 | Simas | Aug. 2, 1938 |
| 2,139,690 | McConnell et al. | Dec. 13, 1938 |
| 2,205,543 | Rideau et al. | June 25, 1940 |
| 2,287,956 | Aff | June 30, 1942 |
| 2,474,390 | Aff | June 28, 1949 |
| 2,515,294 | Cowgill | July 18, 1950 |
| 2,532,014 | Davis | Nov. 28, 1950 |
| 2,609,301 | Lindsey | Sept. 2, 1952 |
| 2,646,357 | Seiferth | July 21, 1953 |
| 2,679,969 | Richter | June 1, 1954 |
| 2,712,591 | Rogell | July 5, 1955 |
| 2,783,357 | Readey | Feb. 26, 1957 |